United States Patent
Nam et al.

(10) Patent No.: US 12,069,639 B2
(45) Date of Patent: Aug. 20, 2024

(54) CONTROL OF SCHEDULING DUTY CYCLE

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Srinivas Yerramalli, San Diego, CA (US); Arumugam Chendamarai Kannan, San Diego, CA (US); Sony Akkarakaran, Poway, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 17/720,831

(22) Filed: Apr. 14, 2022

(65) Prior Publication Data

US 2022/0240271 A1     Jul. 28, 2022

Related U.S. Application Data

(62) Division of application No. 16/910,009, filed on Jun. 23, 2020, now Pat. No. 11,337,231.

(60) Provisional application No. 62/866,531, filed on Jun. 25, 2019.

(51) Int. Cl.
*H04W 72/12*     (2023.01)
*H04W 24/10*     (2009.01)

(52) U.S. Cl.
CPC ........... *H04W 72/12* (2013.01); *H04W 24/10* (2013.01)

(58) Field of Classification Search
CPC .... H04L 5/0053; H04L 5/0091; H04W 24/10; H04W 52/0209–0296; H04W 72/12–14
See application file for complete search history.

(56) References Cited

U.S. PATENT DOCUMENTS

| | | | |
|---|---|---|---|
| 2008/0232284 A1* | 9/2008 | Dalsgaard | H04W 72/23 370/310 |
| 2013/0229964 A1* | 9/2013 | Chakravarthy | H04W 52/0212 370/311 |
| 2015/0305056 A1 | 10/2015 | Vangala et al. | |

(Continued)

FOREIGN PATENT DOCUMENTS

| | | |
|---|---|---|
| CN | 106162716 A | 11/2016 |
| CN | 110267345 A | 9/2019 |

(Continued)

OTHER PUBLICATIONS

"Feedback" by Vocabulary.com Dictionary, Vocabulary.com, https://www.vocabulary.com/dictionary/feedback printed on Oct. 24, 2023. (Year: 2023).*

(Continued)

*Primary Examiner* — Ronald Eisner
(74) *Attorney, Agent, or Firm* — Haynes and Boone, LLP

(57) ABSTRACT

Wireless communications systems and methods related to communicating in a communication medium are provided. A base station (BS) receives from a user equipment (UE), feedback information of the UE. The BS determines a schedule for the UE. The schedule includes a scheduling duty cycle based on the feedback information of the UE. The BS communicates with the UE, a communication signal based on the schedule.

15 Claims, 10 Drawing Sheets

(56) References Cited

U.S. PATENT DOCUMENTS

2017/0332333 A1 11/2017 Santhanam et al.
2020/0413420 A1 12/2020 Nam et al.

FOREIGN PATENT DOCUMENTS

WO 2013116662 A1 8/2013
WO 2017197096 A1 11/2017

OTHER PUBLICATIONS

ETSI TS 136 321 V14.9.0 (Jan. 2019) LTE; Evolved Universal Terrestrial Radio Access (E-UTRA); Medium Access Control (MAC) protocol specification (3GPP TS 36.321 version 14.9.0 Release 14) (Year: 2019).*
Evolution of Physical Downlink Control Channel (PDCCH) for LTE-Advanced Systems, Jan. 2014, International Journal of Advancements in Computing Technology 6:20-36, Authors: Bala Alhaji Salihu, Yang Dacheng, Zhang Xin, Suleiman Zubair. (Year: 2014).*
Ericsson: "Corrections to UE Capability Definitions", 3GPP Draft, 3GPP TSG-RAN2 Meeting #106, R2-1908357, CR38306R1 Corrections to UE Capabilities V02, 3rd Generation Partnership Project (3GPP), Mobile Competence Centre, 650 Route Des Lucioles, F-06921, Sophia-Antipolis Cedex, France, vol. RAN WG2, No. Reno, USA, May 13, 2019-May 17, 2019, May 18, 2019. XP051740489, pp. 1-49, sections 2-8 Annex A. [Continued in Box 2].

[Continued From Box 1] Retrieved from Internet: https://www.3gpp.org/ftp/tsg%5Fran/WG2%5FRL2/TSGR2% 5F106/Docs/R2% 2D1908357%2Ezip. Retrieved on May 18, 2019.
International Preliminary Report On Patentability—PCT/US2020/039350, the International Bureau of WIPO—Geneva, Switzerland. Published Jan. 6, 2022.
International Search Report and Written Opinion—PCT/US2020/039350—ISA/EPO. Published Sep. 1, 2020.
Qualcomm Incorporated: "Potential Techniques for UE Power Saving", 3GPP TSG-RAN WG1 #96, R1-1903016, Potential Techniques for UE Power Saving, 3rd Generation Partnership Project, Mobile Competence Centre, France, vol. RAN WG1, No. Athens, Greece, Feb. 25, 2019-Mar. 1, 2019, Feb. 16, 2019, XP051600713, 33 pgs, sec 2-4, para 2. 2 .1-2. 2. 2 para 2. 3 .1.1-2. 3 .1. 2 para 3. 3 .1-para 3.3.3 para 3. 4 .1-para 3. 4 .1, sec 1-3, in particular sec 3.1, 3.2, 3.3, 3.4.1. 3.4.2, Chapters 3.1.2, 3.1.3, 3.2 and 3.3. [Continued in Box 6].
[Continued From Box 5] Retrieved from Internet: https://www.3gpp.org/ftp/tsg_ran/WG1_RL1/TSGR1_96/Docs/ R1-1903016.zip. Retrieved on Feb. 16, 2019.
Qualcomm Incorporated: "UE Adaptation to the Traffic and UE Power Consumption Characteristics", 3GPP TSG-RAN WG1 Ad-Hoc Meeting 1901, R1-1900911, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, pp. 1-24, Jan. 20, 2019, XP051593757, Chapters 1. 2, sections 1-8, pp. 1-14, p. 14-p. 18, figure 1, p. 22-p. 23.

* cited by examiner

CONTROL OF SCHEDULING DUTY CYCLE

CROSS REFERENCE TO RELATED APPLICATIONS & PRIORITY CLAIM

The present application is a Divisional Application of U.S. patent application Ser. No. 16/910,009, filed Jun. 23, 2020, which claims priority to and the benefit of U.S. Provisional Patent Application No. 62/866,531 filed Jun. 25, 2019, each of which is hereby incorporated by reference in its entirety as if fully set forth below and for all applicable purposes.

TECHNICAL FIELD

This application relates to wireless communication systems, and more particularly to scheduling duty cycle control.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the Long-Term Evolution (LTE) technology to a next generation new radio (NR) technology. One technique for expanding connectivity may be to extend the frequency operation range to higher frequencies since lower frequencies are becoming overcrowded. For example, NR may operate over a wider bandwidth (BW) at higher frequencies than LTE. The mmWave frequency bands between about 30 gigahertz (GHz) to about 300 GHz can provide a large bandwidth for high data rate communications. However, the mmWave frequency bands may have a higher path-loss compared to the lower frequency bands used by conventional wireless communication systems. Additionally, the phase noise may increase at higher frequencies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a base station (BS) from a user equipment (UE), feedback information of the UE; determining, by the BS, a schedule for the UE, the schedule including a scheduling duty cycle based on the feedback information of the UE; and communicating, by the BS with the UE, a communication signal based on the schedule.

In an additional aspect of the disclosure, an apparatus includes a transceiver configured to receive, from a UE, feedback information of the UE and further configured to communicate with the UE, a communication signal based on a schedule. The apparatus also includes a processor configured to determine the schedule for the UE, where the schedule includes a scheduling duty cycle based on the feedback information of the UE.

In an additional aspect of the disclosure, a computer-readable medium having program code recorded thereon, the program code includes code for causing a BS to receive from a UE, feedback information of the UE; code for causing the BS to determine a schedule for the UE, the schedule including a scheduling duty cycle based on the feedback information of the UE; and code for causing the BS to communicate with the UE, a communication signal based on the schedule.

In an additional aspect of the disclosure, an apparatus includes means for receiving from a UE, feedback information of the UE; means for determining a schedule for the UE, the schedule including a scheduling duty cycle based on the feedback information of the UE; and means for communicating with the UE, a communication signal based on the schedule.

In an additional aspect of the disclosure, a method of wireless communication includes transmitting, by a UE to a BS, feedback information of the UE; receiving, by the UE, an indication of a schedule for the UE, the indication indicating a scheduling duty cycle based on the feedback information of the UE; and communicating, by the UE with the BS, a communication signal based on the schedule.

In an additional aspect of the disclosure, an apparatus includes a transceiver configured to transmit to a BS, feedback information of a UE; receive an indication of a schedule for the UE, the indication indicating a scheduling duty cycle based on the feedback information of the UE; and communicate with the BS, a communication signal based on the schedule.

In an additional aspect of the disclosure, a computer-readable medium having program code recorded thereon, the program code includes code for causing a UE to transmit feedback information of the UE to a BS; code for causing the UE to receive an indication of a schedule for the UE, the indication indicating a scheduling duty cycle based on the feedback information of the UE; and code for causing the UE to communicate with the BS, a communication signal based on the schedule.

In an additional aspect of the disclosure, an apparatus includes means for transmitting to a BS, feedback information of a UE; means for receiving an indication of a schedule for the UE, the indication indicating a scheduling duty cycle based on the feedback information of the UE; and means for communicating with the BS, a communication signal based on the schedule.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
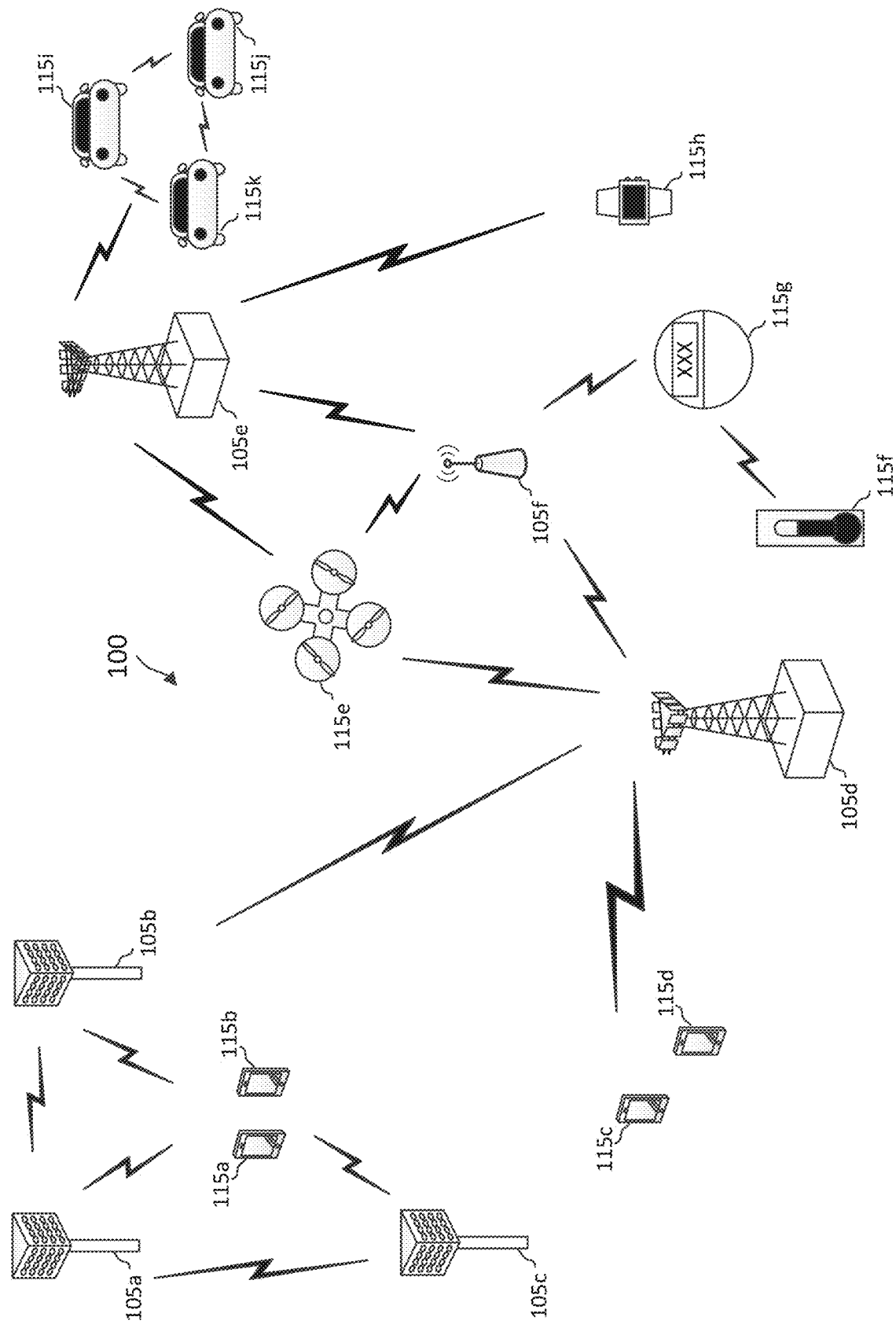
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier PUMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aim to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 milliseconds (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with UL/DL scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer.

FIG. 1 illustrates a wireless communication network 100 according to embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT), and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing (SCS) between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared frequency band or an unlicensed frequency band, for example, at about 3.5 gigahertz (GHz), sub-6 GHz or higher frequencies. The network 100 may partition the frequency band into multiple channels, for example, each occupying about 20 megahertz (MHz).

The mmWave frequency bands tend to have high phase noise. To combat the high phase noise, the subcarrier spacing (e.g., OFDM waveform) or transmission sample rate (like for the single-carrier waveform case) should to be large enough. For example, for NR at a 60 GHz-band and above, the 960 kHz, 1.92 MHz, and 3.84 MHz subcarrier spacings (SCSs) are considered for OFDM waveform compared to the 30 kHz and 120 kHz SCSs for frequency bands below 6 GHz carriers and frequencies around 30 GHz carriers.

The larger the SCS or transmission sample rate, the shorter the TTI or the larger the BW, which may also be beneficial for reducing latency or increasing throughput in the system. A shorter TTI or larger BW may involve more intensive baseband processing at both transmit and receive sides. In this example, it may be advantageous for the system to have a higher clock rate, larger memory size to buffer the data, or dedicated hardware blocks to offset the intense baseband processing. In another example, it may be advantageous for the system to have dedicated hardware processing because some software processing may not have enough speed to process the high data rates. It may be difficult for some devices (e.g., low cost and low energy applications, such as mMTC (massive Machine Type Communications) or devices in power saving modes) to have a high clock rater or large memory size. For example, serving those types of devices with contiguous transmissions back-to-back may result in problems such as processing pipeline blow-out or buffer overrun, increased power consumption, or overheating problems. It may be desirable to overcome these problems.

A duty cycle is the ratio of an active period and a cycle time, where the cycle time is the duration of active time and the sleep time of a device. In some examples, it may be advantageous for the BS to apply a limitation in scheduling, at least temporarily, when serving a UE. As will be discussed in more detail below, the BS may apply a limitation in scheduling a duty cycle of the UE, a limitation in a maximum instantaneous rate to the UE's scheduling duty cycle, or a combination thereof. In some examples, the UE may transmit to the BS, feedback information of the UE. The feedback information may include a UE capability report specifying capability information of the UE, UE assistance information (UAI) specifying preference information of the UE, or a combination thereof. The BS may receive the feedback information of the UE and determine a schedule for the UE, the schedule including a scheduling duty cycle based on the feedback information of the UE. The scheduling duty cycle may include a scheduling "on-period," "off-period," and a cycle, where (on-period/cycle) is based on the feedback information. The BS and the UE may communicate with each other based on the schedule.

Figure 2:
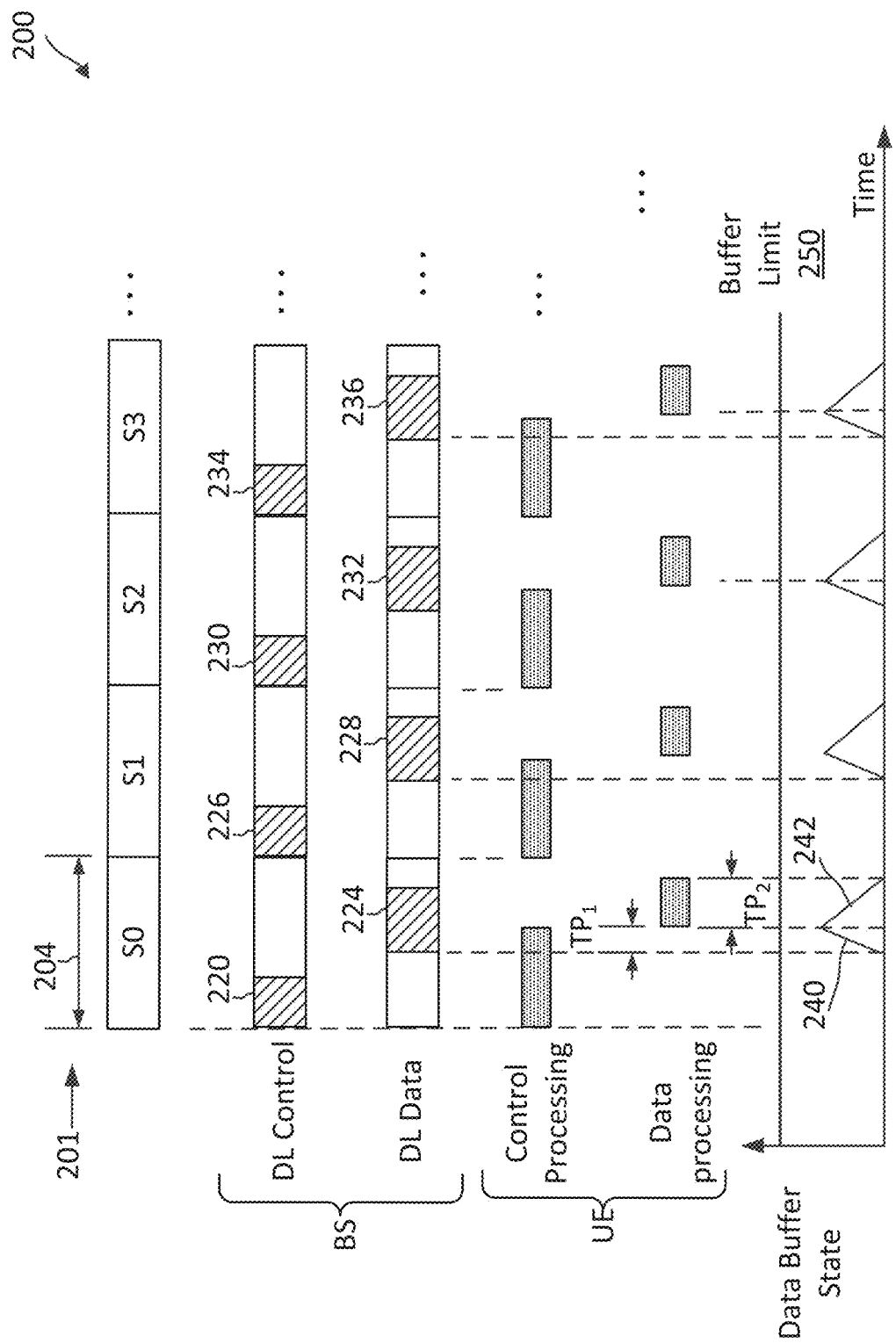
FIG. 2 illustrates a scheduling timeline according to embodiments of the present disclosure.

FIG. 2 illustrates a scheduling timeline 200 according to embodiments of the present disclosure. The scheduling timeline 200 may correspond to a scheduling timeline communicated between a BS 105 and a UE 115 of the network 100. In FIG. 2, the x-axis represents time in some constant units. FIG. 2 shows a frame structure 201 including a plurality of slots 204 in time. The slots 204 are indexed from S0 to S3. For example, a BS may communicate with a UE in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The pattern-filled boxes represent transmissions of DL control information and DL data in corresponding slots 204. As shown, the BS transmits DL control information 220 in the slot 204 indexed S0 (e.g., in a DL control portion of the slot 204). The DL control information 220 may indicate a DL grant for the UE in the same slot 204 indexed S0. Thus, the BS transmits a DL data signal 224 to the UE in the slot 204 indexed S0 (e.g., in a DL data portion of the slot 204). The DL data signal 224 may be scheduled by the DL control information 220.

The UE may receive the DL control information 220 and receive the DL data signal 224 based on the DL grant. The UE processes the DL control information 220 and the DL data signal 224. In an example, the UE may decode the DL control information 220 and based on the information the UE receives from the DL control information 220 (e.g., time-frequency resource allocation, modulation coding scheme (MCS), and/or rank indicator (RI)), the UE may decode the DL data signal 224. Additionally, the UE may maintain a data buffer, where k is a time index, an input rate of the data buffer is denoted by x(k), an output rate of the data buffer is denoted by y(k), and a buffer state of the data buffer is denoted by: $\Sigma_k x(k) - \Sigma_k y(k)$, which is an accumulation of the input rate minus the output rate. The input rate may refer to the rate at which input DL data is received at the receiver of the UE (e.g., from the BS), the output rate may refer to the processing speed for processing the input DL data (e.g., the rate at which the input DL data is processed), and the data buffer state may refer to an amount of data in the buffer.

In FIG. 2, the overall processing time for a slot of data is less than the slot length. In this example, the average input rate and the average output rate are the same and the data buffer eventually flushes out without reaching a buffer limit 250. The buffer limit of a data buffer is the maximum amount of data that the buffer can hold without overrun. While the UE receives the DL control information 220 and processes the DL control information 220, the UE may continue to buffer the data portion corresponding to the DL data signal 224 into the data buffer during a time period $TP_1$, as shown by the positively sloping line 240 in the line graph below. In the line graph, the y-axis represents the amount of data in the buffer in some constant units.

After the UE finishes processing the DL control information 220 at an end of a time period $TP_1$, then based on the control data, the UE starts to process the DL data that was partially buffered during the control channel processing. The UE starts to process the buffered DL data during a time period $TP_2$, which is subsequent to $TP_1$. During the time period $TP_2$, the UE continues to flush out the data buffer, as shown by the negatively sloping line 242 in the line graph below. The UE finishes processing the DL data before the TTI corresponding to the slot 204 indexed S0 elapses. In FIG. 2, the duty cycle is 100 percent.

In some examples, the BS transmits DL control information in the slot 204 (not shown) (e.g., in a DL control portion of the slot 204). The DL control information may indicate an UL grant (e.g., time-frequency resource allocation, MCS, and/or RI) for the UE. The UE transmits an UL data signal to the BS in the slot 204 (e.g., in a UL data portion of the slot 204) based on the UL grant.

The UE performs similar actions for DL control information 226 and DL data signal 228 for the slot 204 indexed S1, for DL control information 230 and DL data signal 232 for the slot 204 indexed S2, and for DL control information 234 and DL data signal 236 for the slot 204 indexed S3, as discussed in relation to the DL control information 220 and the DL data signal 224. As discussed above, the overall processing time for a slot of data is less than the slot length. Accordingly, the data buffer becomes empty by the end of each slot. In this example, over the course of back-to-back scheduling, the BS may continue to transmit the DL control information and/or the corresponding DL data signal to the UE because the data buffer remains stable. A data buffer remains stable if the data buffer state does not cross the upper buffer limit 250.

Figure 3:
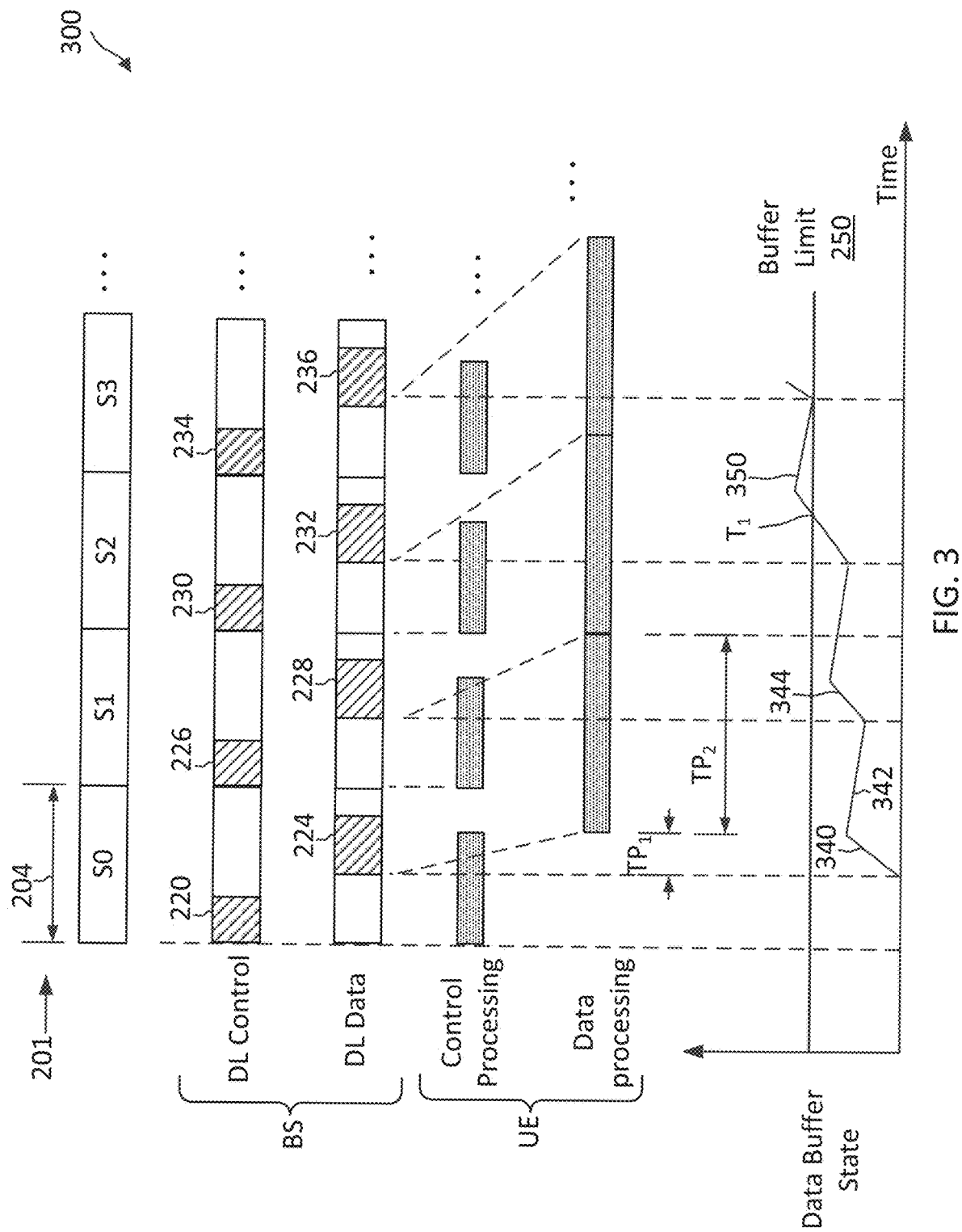
FIG. 3 illustrates the scheduling timeline according to embodiments of the present disclosure.

FIG. 3 illustrates the scheduling timeline 300 according to embodiments of the present disclosure. The scheduling timeline 300 corresponds to the scheduling timeline 200 communicated between a BS 105 and a UE 115 of the network 100. In FIG. 3, the x-axis represents time in some constant units. FIG. 3 shows the frame structure 201 including the plurality of slots 204 in time. The slots 204 are indexed from S0 to S3. In FIG. 3, the overall processing time for a slot of data is longer than the slot length. In this example, for shorter TTIs, the processing timeline is longer compared to the TTI length. Additionally, the data buffer is unstable because the data buffer state crosses the upper buffer limit 250. In other words, the average input rate to the buffer is higher than the average output rate, which eventually causes the buffer overrun.

In FIG. 3, the UE may receive the DL control information 220 indicating a DL grant (e.g., time-frequency resource allocation, MCS, and/or RI) and may receive the DL data signal 224 based on the DL grant. While the UE receives the DL control information 220 and processes the DL control information 220, the UE may continue to buffer the data portion corresponding to the DL data signal 224 into the data buffer during a time period $TP_1$, as shown by the positively sloping line 340 in the line graph below. In the line graph, the y-axis represents the amount of data in the buffer in some constant units. After the UE finishes processing the DL control information 220 at an end of a time period $TP_1$, then based on the decoded DL control data, the UE starts to process the DL data that was partially buffered during the control channel processing. The UE starts to process the buffered DL data during a time period $TP_2$, which is subsequent to $TP_1$. During the time period $TP_2$, the UE continues to flush out the data buffer, as shown by the negatively sloping line 342 in the line graph below.

Before the UE finishes processing the buffered DL data 224, the UE receives DL control information 226 and DL data 228 in the slot 204 indexed S1. In FIG. 3, the length of the processing time for the slot of data is longer than the slot length. Accordingly, the UE buffers the DL control information 226 and the DL data 228 received in the next slot 204 indexed S1. Accordingly, the amount of data in the data buffer will increase, as shown by the positively sloping line 344 in the line graph below. As the UE continues to process the buffered data, the UE will continue to flush out the data buffer, as shown by the negatively sloping line 342 in the line graph below. The UE performs similar actions for DL control information 230 and DL data signal 232 for the slot 204 indexed S2 and for DL control information 234 and DL data signal 236 for the slot 204 indexed S3. If the length of the processing time for the slot of data continues to be longer than the slot length, the buffer data will continue to increase and eventually will cross the buffer limit 250 at time T1. At time T1 in the slot 204 indexed S2, the buffer overrun occurs and some of the data will be lost.

To overcome the buffer overrun problem, the BS may apply a limitation in the scheduling when transmitting the DL control information and/or DL data signal to the UE. The BS may apply the limitation temporarily or permanently for controlling the UE's scheduling duty cycle.

It should be understood that aspects of the present disclosure may be used in conjunction with discontinuous reception (DRX) cycles. DRX is a mechanism in which the UE may enter a sleep mode for a certain period of time and enter a wake-up mode for another period of time. When the UE is in the wake-up mode, the UE may monitor PDDCH and be ready to decode PDCCH. When the UE enters the sleep mode, the UE does not monitor PDCCH. The present disclosure may be used during while the UE is in the wake-up mode, and it may be advantageous to use aspects of the disclosure when the BS schedules back-to-back grants.

Although FIGS. 2 and 3 discuss DL processing by the UE, it should also be understood that the above discussion applies to UL processing by the UE as well. For example, the DL control information may include an UL grant instead of a DL grant, and the DL data may correspond to UL data. The UE may decode the UL grant from the DL control information. The UE may perform UL data processing by preparing (e.g., encoding) data for an UL transmission to a BS.

Figure 4:
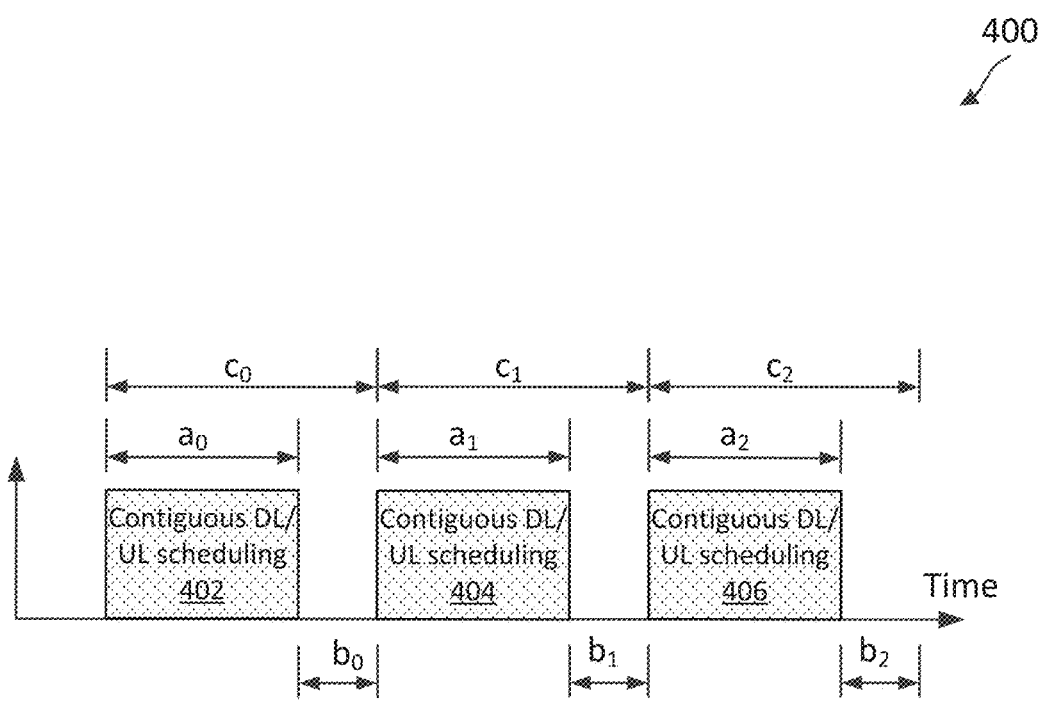
FIG. 4 illustrates a scheduling timeline in which a base station (BS) applies a limitation in the scheduling duty cycle of a user equipment (UE) according to embodiments of the present disclosure.

FIG. 4 illustrates a scheduling timeline 400 in which the BS applies a limitation in the scheduling duty cycle of the UE according to embodiments of the present disclosure. The scheduling timeline 400 may correspond to a scheduling timeline communicated between a BS 105 and a UE 115 of the network 100. In FIG. 4, the x-axis represents time in some constant units. The scheduling timeline 400 may be used as more of a long-term control of the UE's duty cycle compared to the limitation in scheduling duty cycle discussed below in FIG. 5. In FIG. 4, the BS may configure the scheduling parameters $a_k$, $b_k$, and $c_k$, where $a_k$ denotes the scheduling run length, $b_k$ denotes the break period, and $c_k$ denotes the scheduling cycle. The BS schedules the UE in a contiguous manner (e.g., back-to-back) for a certain duration of time $a_k$. Each of the $a_k$, $b_k$, and may $c_k$ correspond to a portion of a slot or one or more slots (e.g., slots 204 in FIG. 2 or FIG. 3) in a scheduling timeline.

The BS may limit the maximum length, maximum density, or the maximum fraction of a contiguous DL/UL scheduling 402, 404, and 406. For example, the overall length of a first scheduling cycle is denoted by $c_0$, which includes the scheduling run length $a_0$ and the break period $b_0$. The BS may schedule the UE for a contiguous DL/UL scheduling 402 during the scheduling run length $a_0$. The BS does not schedule any data for the UE during the break period $b_0$. Accordingly, it is unnecessary for the UE to monitor the network during break periods. During break periods, the UE may process already buffered data (e.g., data that was buffered during the scheduling run length $a_0$).

The break period $b_0$ is subsequent to the scheduling run length $a_0$. Similarly, the overall length of a second scheduling cycle is denoted by $c_1$, which includes the scheduling run length $a_1$ and the break period $b_1$. The BS may schedule the UE for a contiguous DL/UL scheduling 404 during the scheduling run length $a_1$. The break period $b_1$ is subsequent to the scheduling run length $a_1$. Similarly, the overall length of a third scheduling cycle is denoted by $c_2$, which includes the scheduling run length $a_2$ and the break period $b_2$. The BS may schedule the UE for a contiguous DL/UL scheduling 406 during the scheduling run length $a_2$. The break period $b_2$ is subsequent to the scheduling run length $a_2$. The duty cycle is provided by the following equation: $(a_k/c_k)$. In an example, the BS determines the maximum duty cycle of the UE. The BS may limit the UE's maximum duty cycle, and the UE may accordingly have a limited duty cycle.

Figure 5:
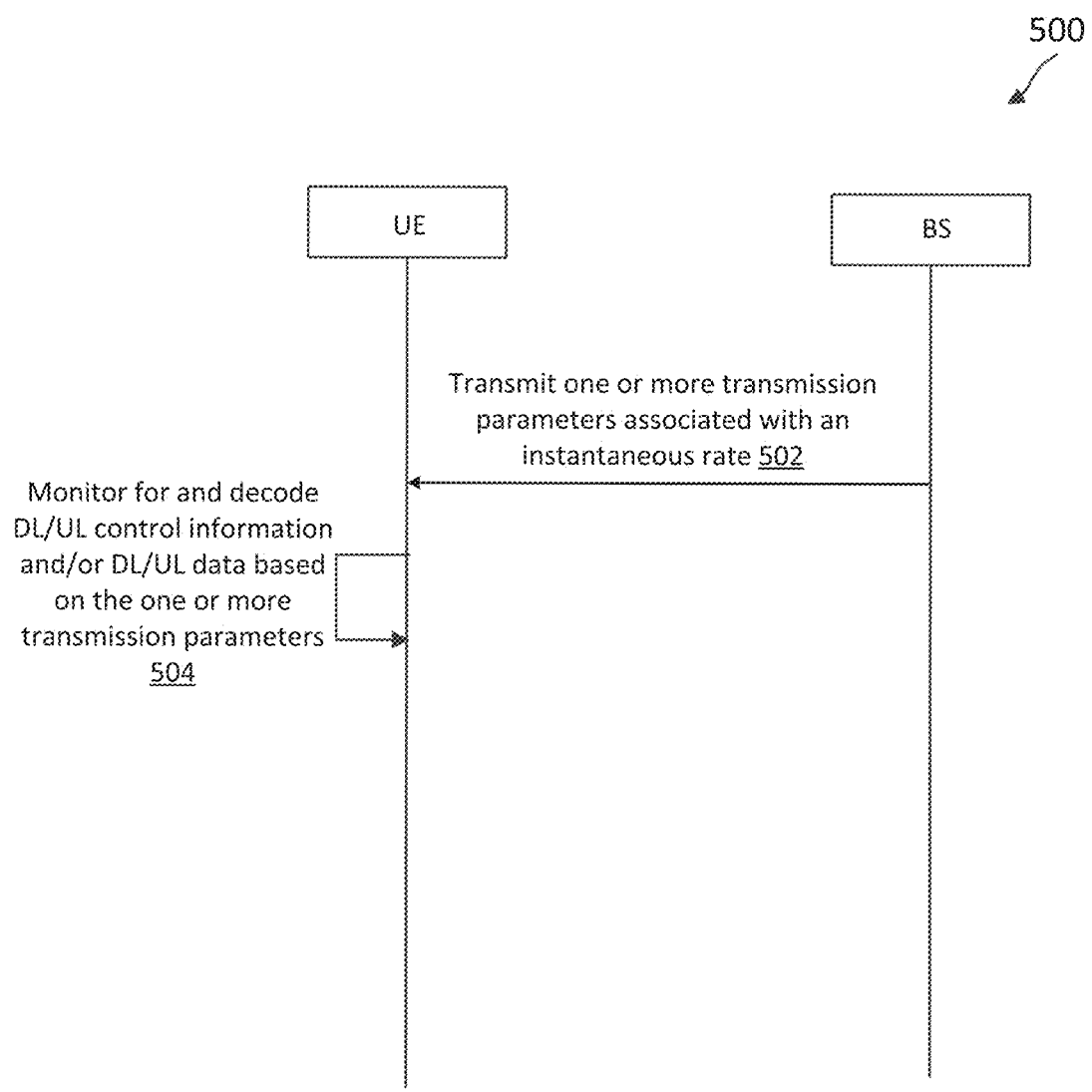
FIG. 5 illustrates a signaling diagram in which the BS applies a limitation in the maximum instantaneous rate to the UE's scheduling duty cycle according to embodiments of the present disclosure.

In some examples, the BS applies a limitation in the maximum instantaneous rate to the UE's scheduling duty cycle. FIG. 5 illustrates a signaling diagram 500 in which the BS applies a limitation in the maximum instantaneous rate to the UE's scheduling duty cycle according to embodiments of the present disclosure. The signaling diagram 500 may correspond to signals communicated between a BS 105 and a UE 115 of the network 100. The signaling diagram 500 may be used as a more direct and short-term control of the UE's duty cycle compared to the limitation in scheduling duty cycle discussed above in FIG. 4.

Actions specified in the signaling diagram 500 can be executed by a computing device (e.g., a processor, processing circuit, and/or other suitable component) of a wireless communication device, such as the BS 105 and the UE 115. As illustrated, the signaling diagram 500 includes a number of enumerated steps, but embodiments of the signaling diagram 500 may include additional steps before, after, and in between the enumerated steps. In some embodiments, one or more of the enumerated steps may be omitted or performed in a different order.

In FIG. 5, at step 502, the BS transmits to the UE one or more transmission parameters associated with an instantaneous rate. A transmission parameter may impact when the UE monitors for, receives, and decodes DL control information and/or DL data from the BS, and in turn may affect the data buffer state. The BS may limit one or more of these transmission parameters to control the instantaneous rate for the UE's scheduling duty cycle. A transmission parameter may be, for example, an MCS, an RI, a number of allocated RBs, and/or a number of allocated symbols. For example, for an allocation with N RBs in M symbols, where each RB includes K subcarriers, the MCS determines the number of bits (e.g., L bits) that can be carried by each subcarrier. In this example, the data is approximately (N*M*K*L). Additionally, the RI indicates the number of spatial layers. In an example, if there are 2 spatial layers (RI=2), then the data size will be (2*N*M*K*L). Accordingly, the instantaneous rate may be $(2*N*M*K*L)/(a_k)$, where $a_k$ is the scheduling run length. The BS may provide the UE with a new MCS for each transmission.

The UE receives the one or more transmission parameters. At step 504, based on the one or more transmission parameters, the UE monitors for and decodes DL control information and/or DL data. Similarly, the signaling diagram 500 can be applied for UL processing, where the UE may monitor for and decode DL control information (e.g., including an UL grant) and/or prepare UL data accordingly.

Figure 6:
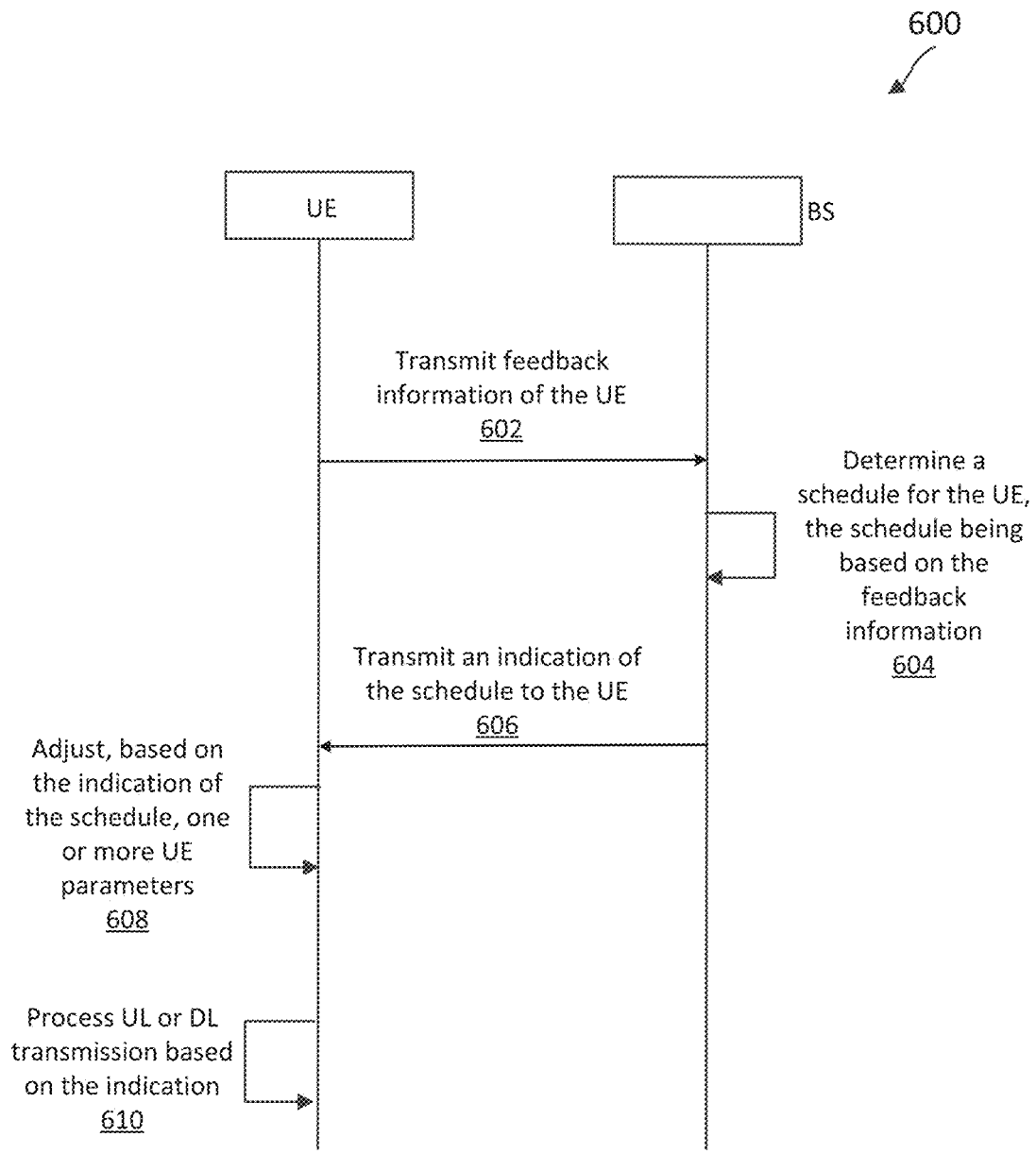
FIG. 6 illustrates a signaling diagram according to embodiments of the present disclosure.

FIG. 6 illustrates a signaling diagram 600 according to embodiments of the present disclosure. The signaling diagram 600 may correspond to signals communicated between a BS 105 and a UE 115 of the network 100. Actions specified in the signaling diagram 600 can be executed by a computing device (e.g., a processor, processing circuit, and/or other suitable component) of a wireless communication device, such as the BS 105 and the UE 115. As illustrated, the signaling diagram 600 includes a number of enumerated steps, but embodiments of the signaling diagram 600 may include additional steps before, after, and in between the enumerated steps. In some embodiments, one or more of the enumerated steps may be omitted or performed in a different order.

In FIG. 6, at step 602, the UE may transmit feedback information of the UE to the BS. The feedback information may include a transmission parameter (e.g., an MCS, an RI, a number of allocated RBs, or a number of allocated symbols). In an example, the feedback information includes a UE capability report specifying capability information of the UE. For example, the capability report may specify the MCS, the RI, the number of allocated RBs, or the number of allocated symbols that the UE is capable of processing for monitoring, receiving, and/or decoding DL control information and/or DL data. The UE may transmit the capability report to the BS during the initial registration process (e.g., during connection establishment).

In another example, the feedback information includes UE assistance information (UAI) specifying preference information of the UE. For example, the UAI may specify the MCS, the RI, the number of allocated RBs, or the number of allocated symbols that the UE prefers for monitoring, receiving, and/or decoding DL control information and/or DL data. The UE may transmit the UAI to the BS during the RRC connected mode operation. The UE may transmit the UAI via, for example, UL RRC signaling, MAC Control Element (CE), or UL control information (UCI). A MAC CE is a special MAC structure carrying control information. Additionally, the UCI may be carried by PUCCH or PUSCH.

The feedback information may be DL feedback information and/or UL feedback information. The UE may transmit DL feedback information for DL transmissions (e.g., decode DL control information and decode DL data) and UL feedback information for UL transmissions (e.g., encode data and/or control for UL transmission) to the BS. The UE may transmit the feedback information to the BS separately for the DL scheduling and the UL scheduling because the UE processes DL transmissions differently from UL transmissions. The signaling from the UE to the BS may be different and separated for the DL and the UL directions. For example, the UE's capability for the DL processing (e.g., decode DL control information and decode DL data) may be different from the UE's capability for the UL processing (e.g., encode data and/or control for UL transmission). In another example, the UE's UAI for the DL processing may be different from the UE's UAI for the UL processing.

In some examples, the UE may provide the BS with a direct indication of the feedback information (e.g., UE's scheduling duty cycle requirements, capabilities, and/or preferences). In an example, the direct indication may include a maximum value(s) or range(s) of one or more scheduling parameters (e.g., $a_k$, $b_k$, $c_k$, etc.), a maximum duty cycle (e.g., $a_k/c_k$), a transmission parameter related to the instantaneous rate (e.g., MCS, an RI, a number of allocated RBs, and/or a number of allocated symbols), or any combination thereof. In some examples, the UE may provide the BS with an indirect indication of the feedback information (e.g., UE's scheduling duty cycle requirements, capabilities, and/or preferences). In an example, the indirect indication may include a buffer size, a processing time of each functional block (e.g., along a transmitter processing path and/or a receiver processing path), a relationship among indicated parameters to derive the duty cycle (e.g., pipeline structure, formulas, etc.). In some examples, the UE may provide the BS with a combination of one or more direct indications and indirect indications of the feedback information.

At step 604, the BS may determine a schedule for the UE, the schedule being based on the feedback information. The schedule may include a scheduling duty cycle based on the feedback information of the UE. Additionally, the scheduling duty cycle may include a scheduling "on-period," "off-period," and a cycle, where (on-period/cycle) is based on the feedback information. The BS may receive the feedback information (e.g., the DL feedback information for DL transmissions and/or the UL feedback information for UL transmissions) from the UE. In this example, the BS may apply different limitations in scheduling the DL and UL duty cycles.

Additionally, the BS may limit the scheduling duty cycle or the maximum instantaneous rate in accordance with feedback information of the UE. In some examples, the BS determines the scheduling duty cycle and/or the instantaneous rate of a UE based on the UE's feedback information, the DL/UL buffer states, other background activities configured for the UE, or a combination thereof. The UE's feedback information may include a UE capability report specifying capability information of the UE and/or the UE's UAI specifying preference information of the UE. Additionally, background activities configured for the UE may include periodic/semi-persistent DL measurement and/or reporting activities, periodic/semi-persistent UL SRS transmission, paging monitoring, and/or radio resource management (RRM).

At step 606, the BS may transmit an indication of the schedule to the UE. The BS may transmit the indication of the schedule by transmitting an indication of the determined duty cycle for the UE to the UE. In an example, the BS may transmit the indication of the schedule to the UE implicitly via RRC reconfiguration and/or MAC CE signaling such that the BS can reconfigure the PDCCH monitoring periodicity, number of aggregated slots, BW of BW parts (BWP), a time-domain resource allocation (TDRA) table, a DRX configuration, etc. In another example, the BS may transmit the indication of the schedule to the UE explicitly via DCI carried by the PDCCH. In this example, the BS may transmit the schedule to the UE and indicate the determined duty cycle using dynamic scheduling with slot aggregation/multi-slot scheduling, indication of the PDCCH-skipping, or Go-to-sleep indication for a certain period of time, etc. It should be understood that the BS may use any combination of the above to indicate the determined scheduling duty cycle for the UE to the UE. Additionally, the scheduling duty cycle may be directed to meeting UE processing and/or buffer constraints, while DRX duty cycle may directed to meeting UE's power consumption.

The UE may receive an indication of the schedule from the BS. The schedule may include a scheduling duty cycle based on the feedback information of the UE. At step 608, the UE adjusts, based on the indication of the schedule (e.g., the indicated scheduled duty cycle), one or more of the UE's parameters. In an example, the UE adjusts its parameters related to the processing clock rate and/or data buffer size, the power saving (sleep) mode operation of each functional block to save power based on the BS's indication, etc.

At step 610, the UE processes an UL or a DL transmission based on the indication. For example, the UE may decode DL control information (e.g., including a DL schedule) and/or DL data based on the indicated DL schedule. In another example, the UE may decode DL control information (e.g., including a UL schedule) and/or encode UL data based on the indicated UL schedule.

Figure 7:
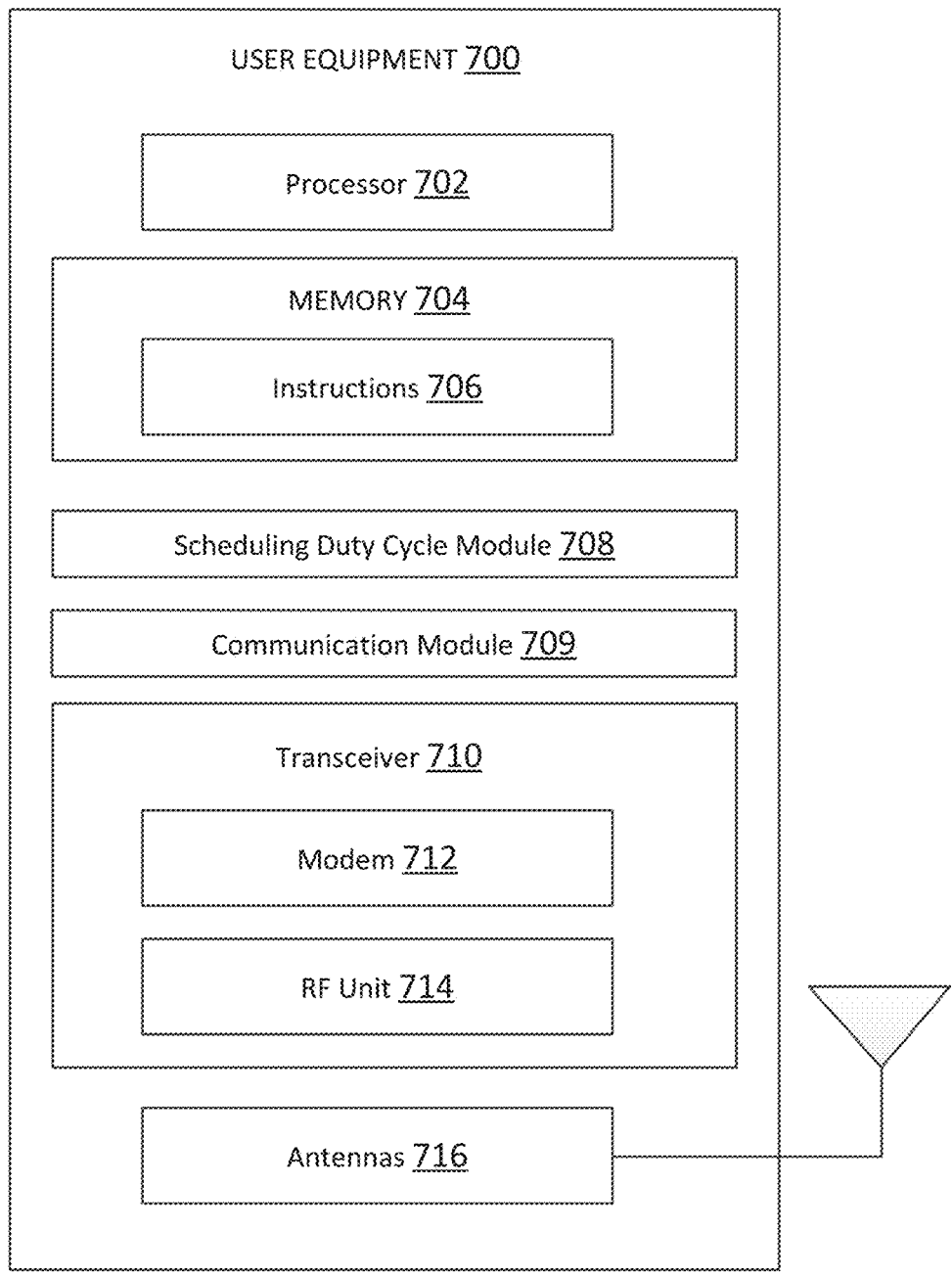
FIG. 7 is a block diagram of an exemplary UE according to embodiments of the present disclosure.

FIG. 7 is a block diagram of an exemplary UE 700 according to embodiments of the present disclosure. The UE 700 may be a UE 115 as discussed above. As shown, the UE 700 may include a processor 702, a memory 704, a scheduling duty cycle module 708, a communication module 709, a transceiver 710 including a modem subsystem 712 and an RF unit 714, and one or more antennas 716. These elements may be in direct or indirect communication with each other, for example, via one or more buses.

The processor 702 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some embodiments, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with embodiments of the present disclosure. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The scheduling duty cycle module 708 and/or the communication module 709 may be implemented via hardware, software, or combinations thereof. For example, the scheduling duty cycle module 708 and/or communication module 709 may be implemented as a processor, circuit, and/or instructions 706 stored in the memory 704 and executed by the processor 702. The scheduling duty cycle module 708 and/or the communication module 709 may be used for various aspects of the present disclosure.

For example, the scheduling duty cycle module 708 is configured to transmit to a BS (e.g., BS 105), feedback information of the UE. The feedback information may include a transmission parameter (e.g., an MCS, an RI, a number of allocated RBs, and/or a number of allocated symbols). In an example, the feedback information includes a UE capability report specifying capability information of the UE. For example, the capability report may specify the MCS, the RI, the number of allocated RBs, or the number of allocated symbols that the UE is capable of processing for monitoring, receiving, and/or decoding DL control information and/or DL data. In another example, the feedback information includes the UAI specifying preference information of the UE. For example, the UAI may specify the MCS, the RI, the number of allocated RBs, or the number of allocated symbols that the UE prefers for monitoring, receiving, and/or decoding DL control information and/or DL data, and/or encoding UL data and/or UL control.

Additionally, the scheduling duty cycle module 708 may provide the BS with a direct indication of the feedback information and/or an indirect indication of the feedback information (e.g., UE's scheduling duty cycle requirements, capabilities, and/or preferences). The direct indication may include a maximum value(s) or range(s) of one or more scheduling parameters (e.g., $a_k$, $b_k$, $c_k$, etc.), a maximum duty cycle (e.g., $a_k/c_k$), a parameter related to the instantaneous rate (e.g., MCS, an RI, a number of allocated RBs, and/or a number of allocated symbols), or any combination thereof. In an example, the indirect indication may include a buffer size, a processing time of each functional block (e.g., along a transmitter processing path and/or a receiver processing path), a relationship among indicated parameters to derive the duty cycle (e.g., pipeline structure, formulas, etc.). In some examples, the UE may provide the BS with a combination of one or more direct indications and indirect indications of the feedback information.

The scheduling duty cycle module 708 is further configured to receive an indication of a schedule for the UE, and the indication indicating a scheduling duty cycle based on the feedback information of the UE. The scheduling duty cycle may include a scheduling "on-period," "off-period," and a cycle, where (on-period/cycle) is based on the feedback information.

The scheduling duty cycle module 708 may receive the indication of the schedule from a BS. The UE may adjust its parameters based on the indicated schedule (the indicated scheduled duty cycle). In an example, the UE adjusts its parameters related to the processing clock rate and/or buffer size, the power saving (sleep) mode operation of each functional block to save power based on the BS's indication, etc. In some examples, the scheduling duty cycle module 708 receives the schedule from the BS.

Additionally, the communication module 709 is configured to communicate with the BS, a communication signal based on the schedule. In an example, the communication signal may be UL control information and/or UL data.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704, the scheduling duty cycle module 708, and/or the communication module 709 according to an MCS, e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 or 700 to enable the UE 115 or 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

Figure 8:
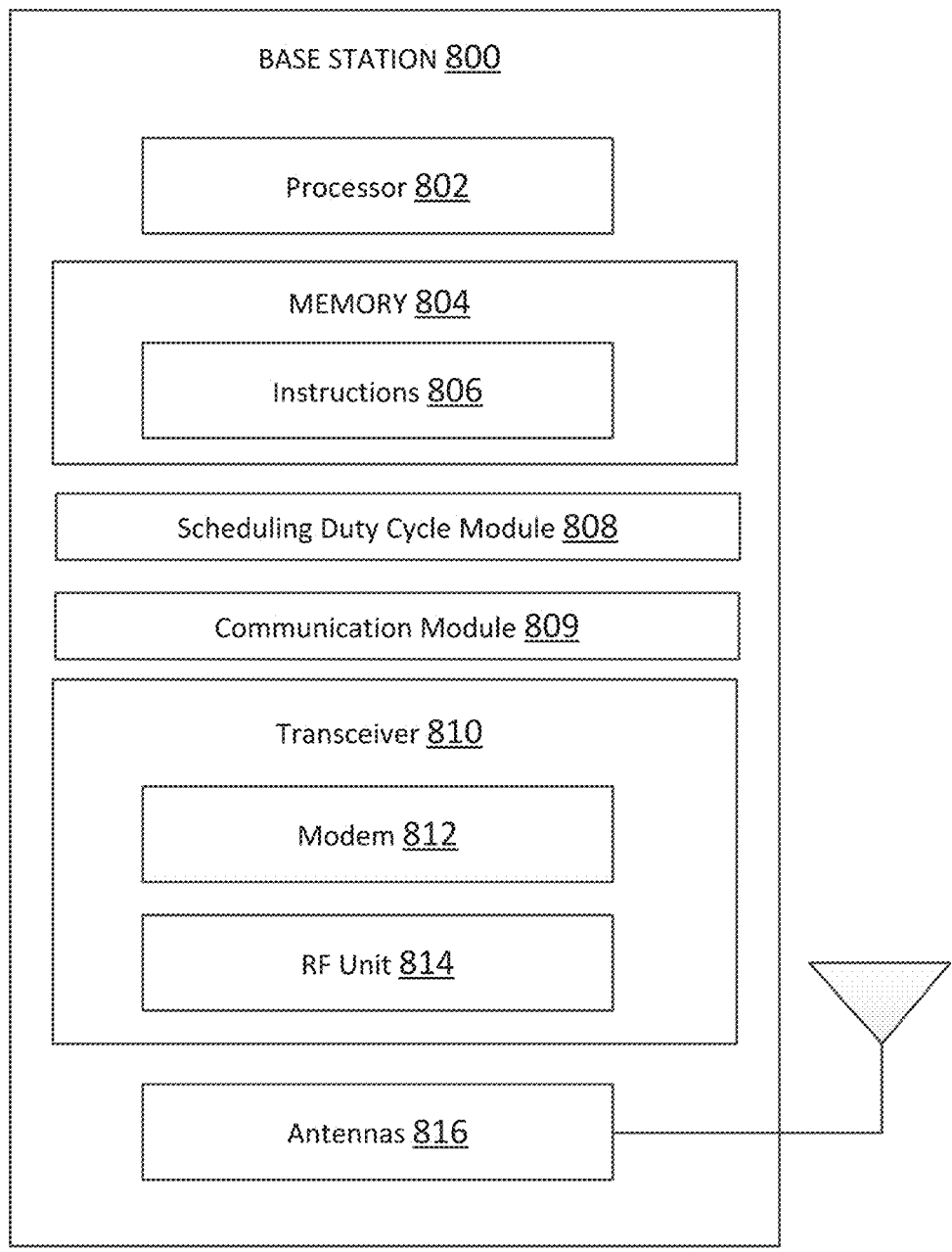
FIG. 8 is a block diagram of an exemplary BS according to embodiments of the present disclosure.

FIG. 8 is a block diagram of an exemplary BS 800 according to embodiments of the present disclosure. The BS 800 may be a BS 105 as discussed above. As shown, the BS 800 may include a processor 802, a memory 804, a scheduling duty cycle module 808, a communication module 809, a transceiver 810 including a modem subsystem 812 and a radio frequency (RF) unit 814, and one or more antennas 816. These elements may be in direct or indirect communication with each other, for example via one or more buses.

The processor 802 may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, solid state memory device, hard disk drives, memristor-based arrays, other forms of volatile and non-volatile memory, or a combination of different types of memory. In some embodiments, the memory 804 includes a non-transitory computer-readable medium. The memory 804 may store instructions 806. The instructions 806 may include instructions that, when executed by the processor 802, cause the processor 802 to perform operations described herein with reference to the BSs 105 in connection with embodiments of the present disclosure. Instructions 806 may also be referred to as code, which may be interpreted broadly to include any type of computer-readable statement(s) as discussed above with respect to FIG. 7.

The scheduling duty cycle module 808 and/or the communication module 809 may be implemented via hardware, software, or combinations thereof. For example, the scheduling duty cycle module 808 and/or communication module 809 may be implemented as a processor, circuit, and/or instructions 806 stored in the memory 804 and executed by the processor 802. The scheduling duty cycle module 808 and/or the communication module 809 may be used for various aspects of the present disclosure.

For example, the scheduling duty cycle module 808 is configured to receive from a UE, feedback information of the UE. The feedback information may include a transmission parameter (e.g., an MCS, an RI, a number of allocated RBs, and/or a number of allocated symbols). In an example, the feedback information includes a UE capability report specifying capability information of the UE. For example, the capability report may specify the MCS, the RI, the number of allocated RBs, or the number of allocated symbols that the UE is capable of processing for monitoring, receiving, and/or decoding DL control information and/or DL data. In another example, the feedback information includes UE assistance information (UAI) specifying preference information of the UE. For example, the UAI may specify the MCS, the RI, the number of allocated RBs, or the number of allocated symbols that the UE prefers for monitoring, receiving, and/or decoding DL control information and/or DL data.

The scheduling duty cycle module 808 is further configured to determine a schedule for the UE, the schedule including a scheduling duty cycle based on the feedback information of the UE. The scheduling duty cycle module 808 may transmit the schedule to a UE. In some examples, the scheduling duty cycle module 808 transmits the determined schedule to the UE.

Additionally, the communication module 809 is configured to communicate with the UE, a communication signal based on the schedule. In an example, the communication signal may be DL control information and/or DL data.

As shown, the transceiver 810 may include the modem subsystem 812 and the RF unit 814. The transceiver 810 can be configured to communicate bi-directionally with other devices, such as the UEs 115 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the BS 105 or 800 to enable the BS 105 or 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The antennas 816 may include multiple antennas of similar or different designs in order to sustain multiple transmission links.

Figure 9:
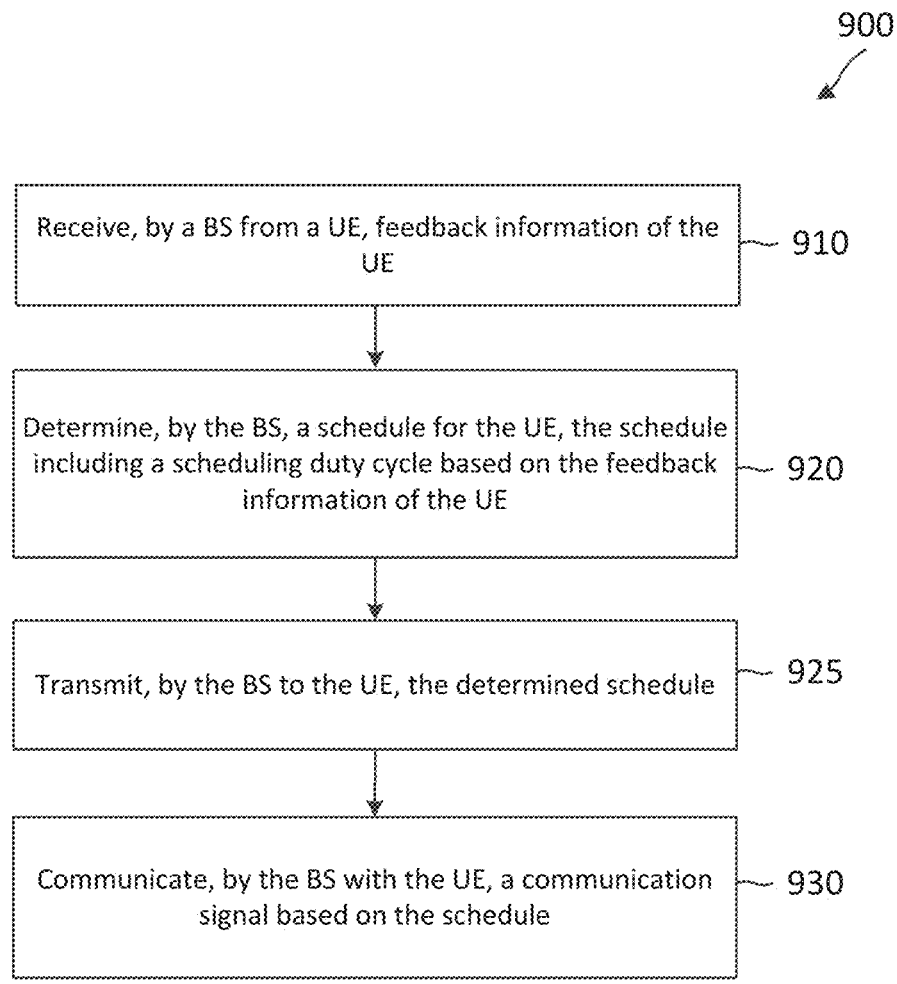
FIG. 9 is a flow diagram of a communication method according to embodiments of the present disclosure.

FIG. 9 is a flow diagram of a communication method 900 according to embodiments of the present disclosure. Steps of the method 900 can be executed by a computing device (e.g., a processor, processing circuit, and/or other suitable component) of a wireless communication device, such as the BSs 105 and 800. In some examples, the BS 105 or BS 800 may utilize one or more components, such as the processor 802, the memory 804, the scheduling duty cycle module 808, the communication module 809, the transceiver 810, and/or the antennas 816 to execute the steps of method 900. The method 900 may employ similar mechanisms as in the scheduling timeline 400 in FIG. 4, signaling diagram 500 in FIG. 5, and signaling diagram 600 in FIG. 6. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes receiving, by a BS from a UE, feedback information of the UE. At step 920, the method 900 includes determining, by the BS, a schedule for the UE, the schedule including a scheduling duty cycle based on the feedback information of the UE. At step 925, the method 900 includes transmitting, by the BS to the UE, the determined schedule. At step 930, the method 900 includes communicating, by the BS with the UE, a communication signal based on the schedule.

Figure 10:
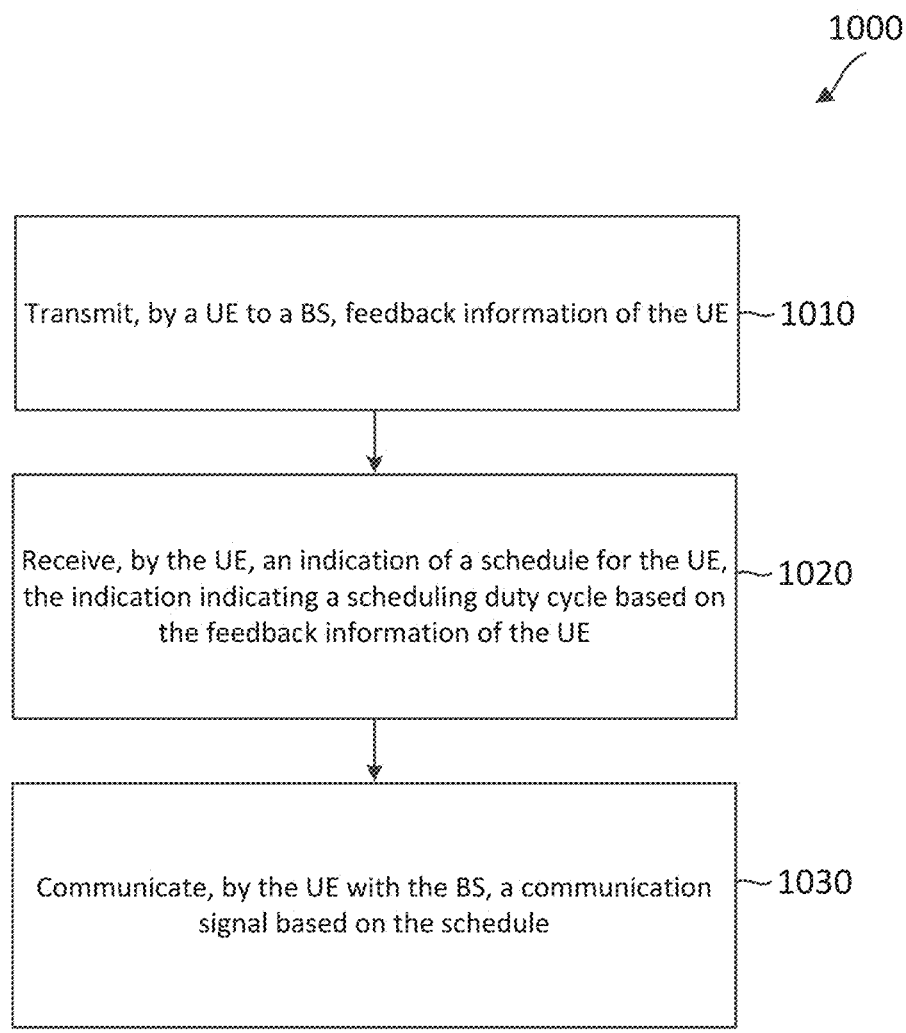
FIG. 10 is a flow diagram of a communication method according to embodiments of the present disclosure.

FIG. 10 is a flow diagram of a communication method 1000 according to embodiments of the present disclosure. Steps of the method 1000 can be executed by a computing device (e.g., a processor, processing circuit, and/or other suitable component) of a wireless communication device, such as the UEs 115 and 700. In some examples, the UE 115 or UE 700, may utilize one or more components, such as the processor 702, the memory 704, the scheduling duty cycle module 708, the communication module 709, the transceiver 710, and/or the antennas 716 to execute the steps of method 1000. The method 1000 may employ similar mechanisms as in the scheduling timeline 400 in FIG. 4, signaling diagram 500 in FIG. 5, and signaling diagram 600 in FIG. 6. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes transmitting, by a UE to a BS, feedback information of the UE. At step 1020, the method 1000 includes receiving, by the UE, an indication of a schedule for the UE, the indication indicating a scheduling duty cycle based on the feedback information of the UE. At step 1030, the method 1000 includes communicating, by the UE with the BS, a communication signal based on the schedule.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a base station (BS) from a user equipment (UE), information of the UE, the information indicating a UE capability for monitoring and/or decoding downlink control information (DCI) on a physical downlink control channel (PDCCH);
determining, by the BS, a scheduling duty cycle based on the information of the UE, wherein the scheduling duty cycle comprises:
a scheduling period for the UE to monitor the PDCCH; and
a break period;
transmitting, via DCI, an indication of the scheduling duty cycle; and
communicating, by the BS with the UE, based on the scheduling duty cycle indicated via the DCI.

2. The method of claim 1, wherein receiving the information includes receiving a UE capability report.

3. The method of claim 1, wherein receiving the information includes receiving UE assistance information (UAI) specifying preference information of the UE.

4. The method of claim 1, wherein receiving the information includes receiving a direct indication of the information from the UE.

5. The method of claim 4, wherein the direct indication includes a maximum value or range of one or more scheduling parameters, a maximum duty cycle, or a transmission parameter related to an instantaneous rate associated with the scheduling duty cycle.

6. The method of claim 5, wherein the transmission parameter includes a modulation coding scheme (MCS), a rank indicator (RI), a number of allocated resource blocks (RBs), or a number of allocated symbols.

7. The method of claim 1, wherein receiving the information includes receiving an indirect indication of the information from the UE.

8. The method of claim 7, wherein the indirect indication includes a buffer size, a processing time of one or more functional blocks, or a relationship among indicated parameters to derive the scheduling duty cycle.

9. An apparatus comprising:
   a transceiver configured to:
      receive, from a user equipment (UE), information of the UE, the information indicating a UE capability for monitoring and/or decoding downlink control information (DCI) on a physical downlink control channel PDCCH);
      transmit, to the UE, an indication of a scheduling duty cycle via a DCI on the PDCCH; and
      communicate with the UE, a communication signal based on the scheduling duty cycle; and
   a processor configured to:
      determine the scheduling duty cycle for the UE, wherein the scheduling duty cycle is based on the information of the UE, wherein the scheduling duty cycle comprises:
         a scheduling period for the UE to monitor the PDCCH; and
         a break period.

10. The apparatus of claim 9, wherein the information includes a UE capability report.

11. The apparatus of claim 9, wherein the information includes UE assistance information (UAI) specifying preference information of the UE.

12. The apparatus of claim 9, wherein the processor is configured to reconfigure a physical downlink control channel (PDCCH) monitoring periodicity, a number of aggregated slots, bandwidth (BW) of BW parts (BWP), a time-domain resource allocation (TDRA) table, or a discontinuous reception (DRX) configuration.

13. The apparatus of claim 9, wherein the processor limits a maximum length of a contiguous DL and UL scheduling duty cycle for the UE .

14. The apparatus of claim 9, wherein the processor applies a limitation in a maximum instantaneous rate to the scheduling duty cycle, wherein the limitation is based one at least of modulation coding scheme (MCS), a rank indicator (RI), a number of allocated resource blocks (RBs), or a number of allocated symbols.

15. A non-transitory computer-readable medium having program code recorded thereon, the program code comprising:
   code for causing a base station (BS) to receive from a user equipment (UE), information of the UE, the information indicating a UE capability for monitoring and/or decoding downlink control information (DCI) on a physical downlink control channel PDCCH);
   code for causing the BS to determine a schedule for the UE, the schedule including a scheduling duty cycle based on the information of the UE, wherein the scheduling duty cycle comprises:
      a scheduling period for the UE to monitor the PDCCH; and
      a break period;
   code for causing the BS to transmit, to the UE, an indication of the scheduling duty cycle via DCI; and
   code for causing the BS to communicate with the UE, a communication signal based on the schedule.

* * * * *